United States Patent
Isobe et al.

(10) Patent No.: US 9,682,453 B2
(45) Date of Patent: Jun. 20, 2017

(54) TOOL CHANGER FOR MACHINE TOOL

(71) Applicant: FANUC CORPORATION, Yamanashi (JP)

(72) Inventors: Gaku Isobe, Yamanashi (JP); Masahiro Murota, Yamanashi (JP); Naoki Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 14/685,709

(22) Filed: Apr. 14, 2015

(65) Prior Publication Data
US 2015/0290755 A1     Oct. 15, 2015

(30) Foreign Application Priority Data
Apr. 15, 2014    (JP) ................. 2014-083328

(51) Int. Cl.
B23Q 3/157     (2006.01)
B23Q 3/155     (2006.01)
B23Q 1/54     (2006.01)

(52) U.S. Cl.
CPC ....... B23Q 3/15706 (2013.01); B23Q 1/5406 (2013.01); B23Q 3/15526 (2013.01); B23Q 3/15534 (2016.11); Y10T 483/1755 (2015.01); Y10T 483/1795 (2015.01)

(58) Field of Classification Search
CPC ............ B23Q 3/15506; B23Q 3/15566; B23Q 3/15706; Y10T 483/1752; Y10T 483/1755; Y10T 483/1757; Y10T 483/176; Y10T 483/179; Y10T 483/1793; Y10T 483/1795; Y10T 483/1798

USPC .............. 483/38, 39, 40, 41, 54, 55, 56, 57; 74/457, 458, 459, 460, 461, 462, 463, 74/464, 465, 466
See application file for complete search history.

(56) References Cited

U.S. PATENT DOCUMENTS

| | | | |
|---|---|---|---|
| 4,679,296 A | 7/1987 | Watanabe et al. | |
| 4,870,744 A | 10/1989 | Araki et al. | |
| 7,387,600 B1 * | 6/2008 | Sun .................... | B23Q 3/15706 483/39 |

(Continued)

FOREIGN PATENT DOCUMENTS

| CN | 1765569 A | 5/2006 |
|---|---|---|
| CN | 102267065 A | 12/2011 |

(Continued)

OTHER PUBLICATIONS

Office Action mailed Jul. 28, 2015, corresponding to Japanese patent application No. 2014-083328.

(Continued)

*Primary Examiner* — Erica E Cadugan
*Assistant Examiner* — Michael Vitale
(74) *Attorney, Agent, or Firm* — Hauptman Ham, LLP

(57) ABSTRACT

A tool changer for a machine tool is provided with a spindle head, tool magazine, rotating shaft, and magazine drive motor. The tool magazine is provided with a tool-magazine power transmission unit. The tool-magazine power transmission unit and a magazine-drive-motor power transmission unit engage with each other at all times between a proximity position and a separated position relative to the spindle head of the tool magazine.

1 Claim, 4 Drawing Sheets

(56) References Cited

U.S. PATENT DOCUMENTS

| | | | |
|---|---|---|---|
| 2011/0319239 A1* | 12/2011 | Gerst | B23Q 3/15706 483/56 |
| 2012/0116570 A1 | 5/2012 | Nishioka et al. | |
| 2012/0241342 A1* | 9/2012 | Sun | B23Q 3/15706 483/66 |
| 2013/0345034 A1* | 12/2013 | Liu | B23Q 3/15706 483/38 |
| 2015/0290755 A1 | 10/2015 | Isobe et al. | |

FOREIGN PATENT DOCUMENTS

| | | |
|---|---|---|
| CN | 202780640 U | 3/2013 |
| CN | 204711639 U | 10/2015 |
| JP | 60-155338 A | 8/1985 |
| JP | 60-232845 A | 11/1985 |
| JP | 63-62630 A | 3/1988 |

OTHER PUBLICATIONS

Office Action in CN Application No. 201510175534.2 dated Jan. 4, 2017.

\* cited by examiner

PROXIMITY POSITION

SEPARATED POSITION

PROXIMITY POSITION

SEPARATED POSITION

PROXIMITY POSITION

SEPARATED POSITION

PROXIMITY POSITION

SEPARATED POSITION

PROXIMITY POSITION

SEPARATED POSITION

TOOL CHANGER FOR MACHINE TOOL

RELATED APPLICATIONS

The present application claims priority to Japanese Application Number 2014-083328, filed Apr. 15, 2014, the disclosure of which is hereby incorporated by reference herein in its entirety.

BACKGROUND OF THE INVENTION

Field of the Invention

The present invention relates to a tool changer, capable of automatically changing a tool used in a machine tool.

Description of the Related Art

A tool changer is conventionally used to automatically change a tool to be mounted on the spindle of a machine tool. A plurality of necessary work tools are previously set on this tool changer and a tool magazine is turned to index the tool and attach or detach it to or from the spindle of the machine tool. The tool to be attached to the spindle is automatically replaced with a tool specified based on the machining state.

FIGS. 6 and 7 are views showing a conventional tool changer, in which a tool magazine is rotatable toward and away from a spindle head.

Since the entire tool magazine can be moved from the vicinity of the spindle head in the tool changer of this type, a wide machining area can be secured. Further, the spindle head can be made larger than a spindle head in the case where the tool magazine is immovable, so that the rigidity of a spindle can be increased.

Japanese Patent Application Laid-Open No. 63-062630 discloses a tool changer for a machine tool configured so that a tool magazine is turned using a spindle motor. According to this device, a wide machining area is secured by making the tool magazine rotatable toward and away from a spindle head.

According to some conventional techniques, a wide machining area can be secured or the rigidity of a spindle can be increased by making a tool magazine rotatable toward and away from a spindle head.

In tool changers for a machine tool according to these conventional techniques and that disclosed in Japanese Patent Application Laid-Open No. 63-062630, however, the tool magazine and a magazine drive motor are connected only when the tool magazine is in a tool change position where it is located close to the spindle head. Thus, the tool magazine cannot be turned at any time other than during tool change.

SUMMARY OF THE INVENTION

Accordingly, the object of the present invention is to provide a tool changer capable of turning a tool magazine at a time other than during tool change by maintaining connection between the tool magazine and a magazine drive motor even when the tool magazine is located in a separated position relative to a spindle head.

A tool changer for a machine tool according to the present invention comprises a spindle head supporting a spindle for rotation, a tool magazine provided with a plurality of grips for holding a tool on the periphery thereof, a pivot axis about which the tool magazine is configured to be turned to index the tool, a rotating shaft for rotating the tool magazine toward and away from the spindle head, and a magazine drive motor for turning the tool magazine. The tool magazine comprises a tool-magazine power transmission unit, the magazine drive motor comprises a magazine-drive-motor power transmission unit, and the tool-magazine power transmission unit and the magazine-drive-motor power transmission unit are configured to engage with each other at all times between a proximity position and a separated position relative to the spindle head of the tool magazine.

With the above configuration, the tool magazine can be turned at a time other than during tool change by maintaining connection between the tool magazine and the magazine drive motor even when the tool magazine is located in the separated position relative to the spindle head.

Since the tool magazine can be turned at a time other than during the tool change, moreover, a chip spin-off function by a swinging turret or a tool weight deviation detecting function based on monitoring of the load torque of the magazine drive motor can be achieved even at a time other than during the tool change.

The relative positions of the tool magazine and the magazine drive motor may be made substantially constant even when the tool magazine is rotated.

With the above configuration, the relative positions of the tool magazine and the magazine drive motor are constant even when the tool magazine is rotated, so that the connection between the tool magazine and the magazine drive motor can always be maintained to enable operation of the tool magazine even at a time other than during the tool change.

The magazine drive motor may be secured to an immovable portion of the machine tool, the magazine-drive-motor power transmission unit may comprise a magazine-drive-motor-side gear secured to a shaft of the magazine drive motor, the tool-magazine power transmission unit may comprise a tool-magazine-side gear secured to the tool magazine and comprising a gear tooth surface meshing with the magazine-drive-motor-side gear, and a cross-section of the gear tooth surface of the tool-magazine-side gear taken along a plane containing the pivot axis of the tool magazine may be in the shape of a circular arc about the pivot of rotation of the tool magazine.

With the above configuration, the connection between the tool magazine and the magazine drive motor can always be maintained even when the tool magazine is rotated, so that the operation of the tool magazine can be performed even at a time other than during the tool change.

According to the present invention configured as described above, there can be provided a tool changer capable of turning a tool magazine at a time other than during tool change by maintaining connection between the tool magazine and a magazine drive motor even when the tool magazine is located in a separated position relative to a spindle head.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A prior art technique will be described first.

Figure 6:
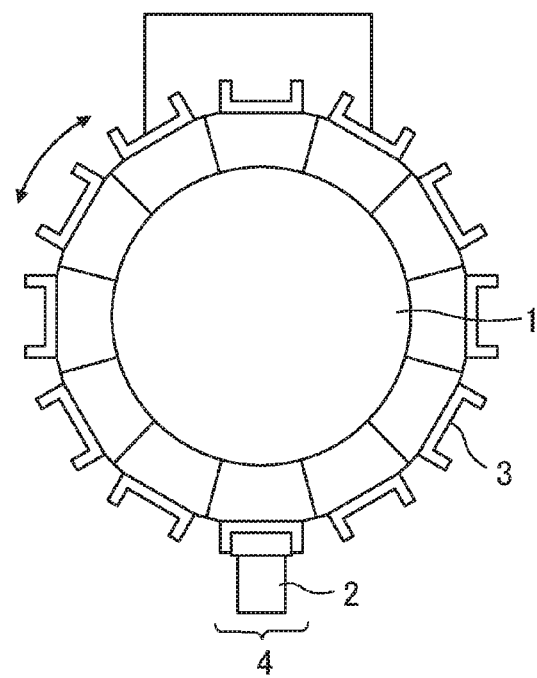
FIG. 6 is a schematic front view of a machine tool with a conventional tool changer.

FIG. 6 is a schematic front view of a machine tool with a conventional tool changer. Numeral 1 denotes a tool magazine, which is provided with a plurality of grips 3 on its periphery. Each of the grips 3 can hold a tool 2. Further, the tool magazine 1 is turnable so that the tool can be indexed to a tool change position 4 of FIG. 6 for tool change.

Figure 7:
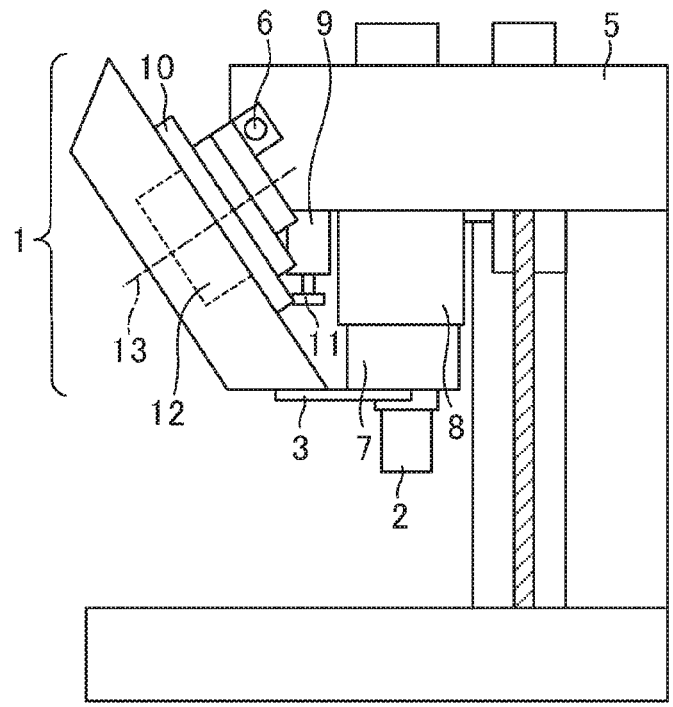
FIG. 7 is a schematic side view of the machine tool with the conventional tool changer.

FIG. 7 is a schematic side view of the machine tool with the conventional tool changer. Numeral 5 denotes a magazine supporting portion, on which a spindle head 8 and a spindle 7 are mounted, and one of the grips 3 is attached to the distal end portion of the spindle 7 so that the grip 3 can hold the tool. Further, a magazine drive motor 9 is mounted on a part the magazine supporting portion 5 separate from that part on which the spindle head 8 and the spindle 7 are mounted. A magazine-drive-motor-side gear 11 is disposed on the distal end portion of the magazine drive motor 9.

Furthermore, numeral 1 denotes the tool magazine, which is pivotally supported on the magazine supporting portion 5 by a pivot pin 6. The tool magazine 1 comprises a tool-magazine-side gear 10 and a magazine shaft 12. The magazine-side gear 10 is rotatable relative to the magazine shaft 12 about a pivot axis 13. When the motor-side gear 11 and the magazine-side gear 10 mesh with each other, power from the magazine drive motor 9 is transmitted to the tool magazine 1 through the gears 11 and 10, whereby the tool magazine 1 is turned.

Figure 8A:
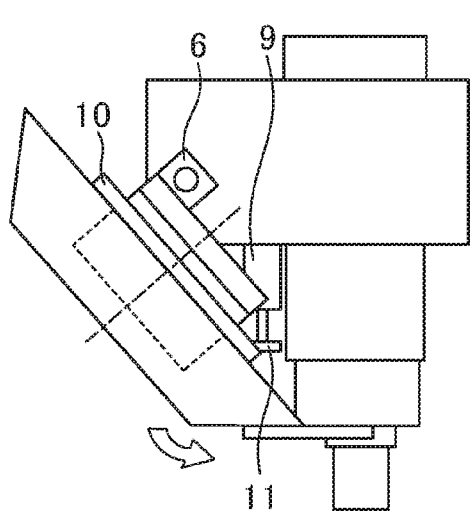
FIGS. 8A and 8B are schematic side views of the conventional tool changer showing how a tool magazine rotates in such a direction as to approach or leave a spindle head.
Figure 8B:
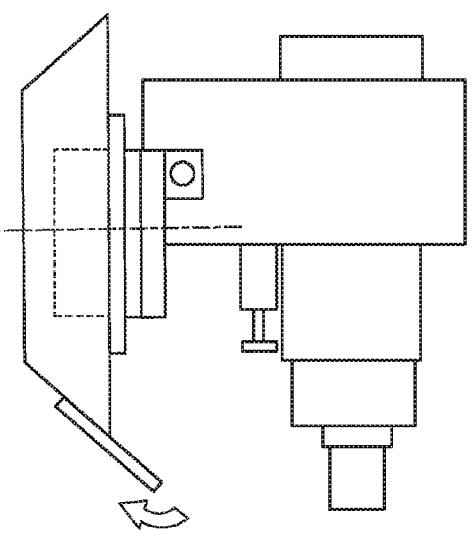

FIGS. 8A and 8B are schematic side views of the conventional tool changer showing how the tool magazine rotates in such a direction as to approach or leave the spindle head 8. FIGS. 8A and 8B show a proximity position and a separated position, respectively.

During the tool change, the tool magazine 1 rotates about the pivot pin 6 to approach the spindle head 8 and reach the proximity position of FIG. 8A. In this position, the grip 3 holds the tool 2 attached to the spindle 7 so that the tool can be changed. In this proximity position, moreover, the magazine-side gear 10 and the motor-side gear 11 mesh with each other so that the tool magazine 1 can be turned by the magazine drive motor 9.

During operation other than the tool change, as shown in FIG. 8B, the tool magazine 1 is moved away from the spindle head 8 about the pivot pin 6. A wide machining area can be secured by thus making the tool magazine 1 rotatable between the proximity position and the separated position. Further, the spindle head 8 can be made large enough to provide a highly rigid structure.

According to the tool changer of this type, as shown in FIG. 8B, however, the magazine-side gear 10 and the motor-side gear 11 are disengaged from each other in the separated position during the operation other than the tool change, so that the driving force of the magazine drive motor 9 cannot be transmitted to the tool magazine 1 to turn it. Thus, it has been impossible to achieve a chip spin-off function or a tool weight deviation detecting function by operating the tool magazine at a time other than during the tool change.

The following is a description of some embodiments of the present invention.

Figure 1A:
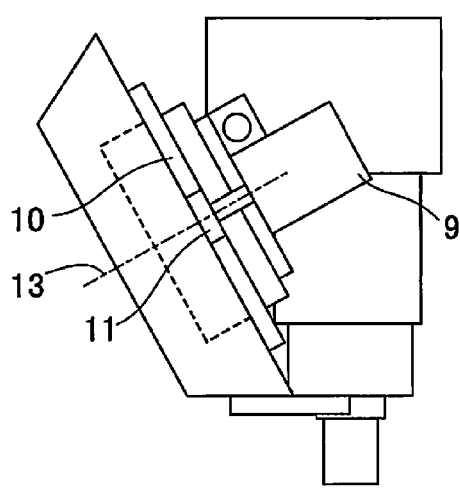
FIGS. 1A and 1B are schematic side views of a tool changer according to one embodiment of the present invention.
Figure 1B:
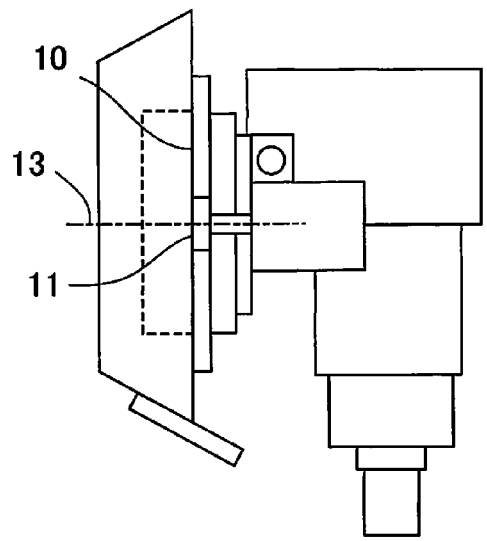
Figure 2A:
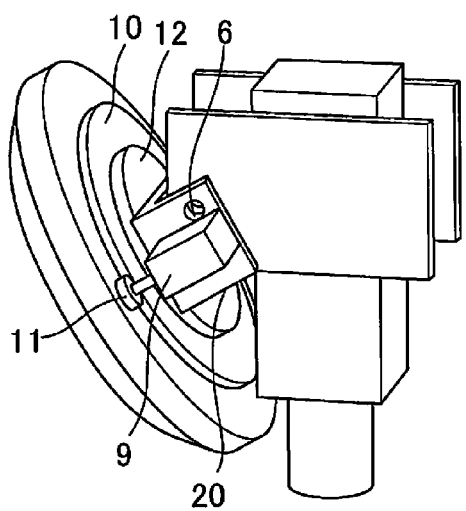
FIGS. 2A and 2B are schematic diagonal views of the tool changer according to the embodiment of the invention.
Figure 2B:
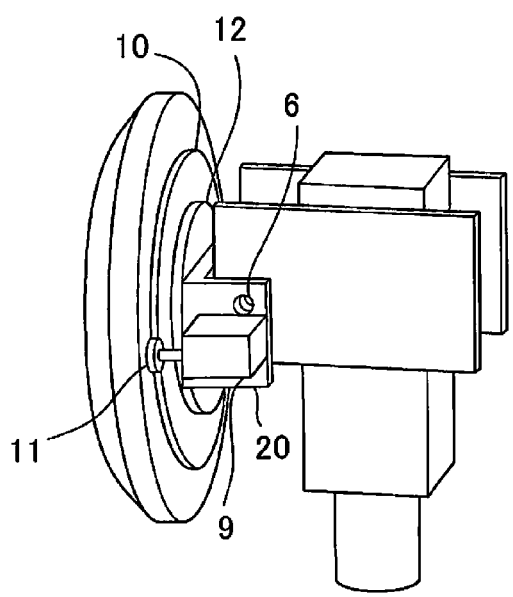

FIGS. 1A, 1B, 2A and 2B show a tool changer according to one embodiment of the present invention. FIGS. 1A and 1B are schematic side views, and FIGS. 2A and 2B are schematic diagonal views. FIGS. 1A and 1B show a proximity position, and FIGS. 2A and 2B show a separated position. A tool magazine 1 of the present embodiment, like its prior art counterpart, is pivotally supported on a magazine supporting portion 5 so as to be rotatable about a pivot pin 6. A tool-magazine-side gear 10 and a magazine shaft 12 are concentrically disposed on the tool magazine 1. Since portions other than the tool magazine 1 and a magazine drive motor 9 are the same as those in the prior art, like reference numerals are used to designate like portions, and a repeated description thereof is omitted.

In the present embodiment, as shown in FIGS. 2A and 2B, in particular, the magazine drive motor 9 is secured to a rotating member 20 that constitutes a part of the tool magazine 1 and rotates about the pivot pin 6. Further, a magazine-drive-motor-side gear 11 of the magazine drive motor 9 is configured to extend substantially parallel to a pivot axis 13 of the tool magazine 1 and mesh with the magazine-side gear 10 on the outer periphery thereof. Without regard to the turning position of the tool magazine 1, therefore, the relative positions of the tool magazine 1 and the magazine drive motor 9 hardly change, so that the connection between the gears 10 and 11 is maintained and the magazine drive motor 9 rotates integrally with the tool magazine 1. Thus, the connection between the magazine drive motor 9 and the tool magazine 1 can be maintained to enable rotation of the tool magazine 1 even in a position other than the proximity position for tool change.

Figure 3A:
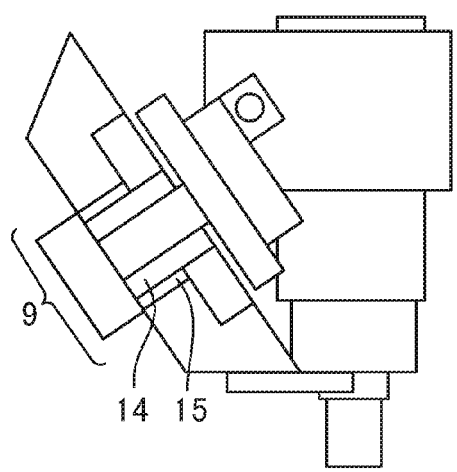
FIGS. 3A and 3B are views showing a modification of the one embodiment of the invention.
Figure 3B:
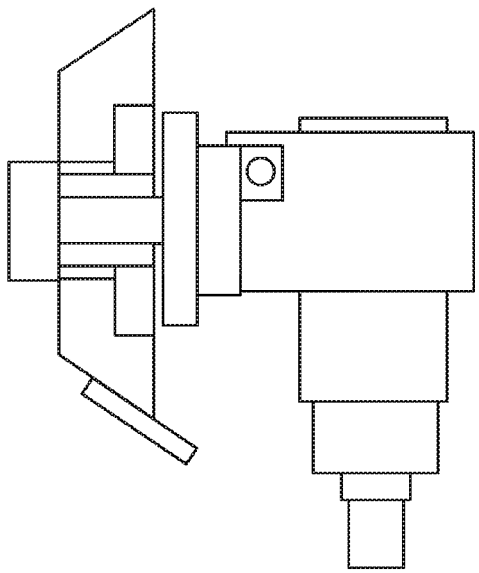

FIGS. 3A and 3B show a modification of the one embodiment of the present invention. In the embodiment described above, the magazine drive motor 9 is located on the side of the spindle head 8 relative to the tool magazine 1. In this modification, in contrast, the magazine drive motor 9 is located on the opposite side of the tool magazine 1 to the spindle head 8, as shown in FIGS. 3A and 3B. The magazine drive motor 9 is provided with a rotor 14 and a stator 15. The rotor 14 is configured to mesh with a turning portion of the tool magazine 1. In this modification, the driving force of the magazine drive motor 9 is transmitted directly to the tool magazine 1. In another modification, however, a speed reduction mechanism may be provided between the magazine drive motor 9 and the tool magazine 1.

Figure 4A:
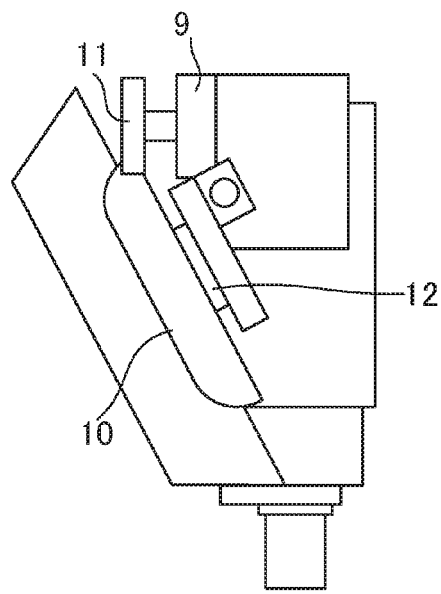
FIGS. 4A and 4B are views showing another embodiment of the invention.
Figure 4B:
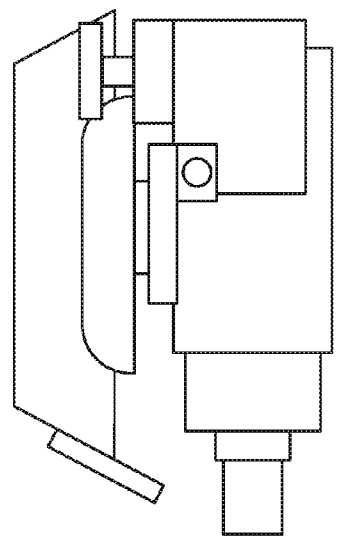

FIGS. 4A and 4B are views showing another embodiment. In the present embodiment, a magazine drive motor 9 is secured to an immovable portion of a machine tool and configured so that its motor-side gear 11 extends substantially perpendicular to the direction in which a spindle head 8 and a spindle 7 extend. A tool-magazine-side gear 10 is disposed on the side of a tool magazine 1 so as to be concentric with a pivot axis 13 of the tool magazine 1 and mesh with the motor-side gear 11.

Figure 5A:
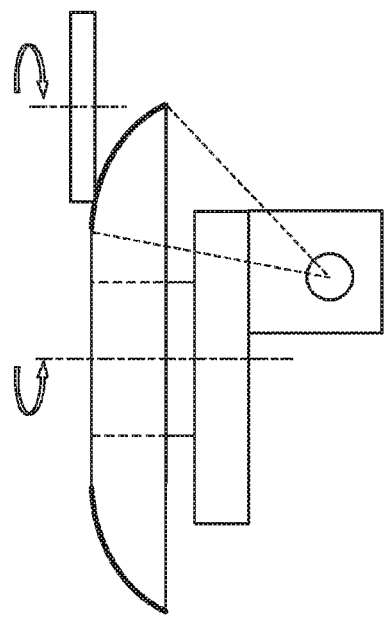
FIGS. 5A and 5B are side views of a tool-magazine-side gear shown in FIGS. 4A and 4B.
Figure 5B:
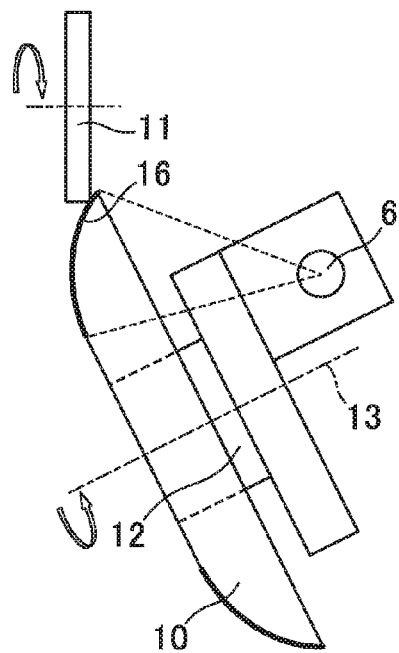

FIGS. 5A and 5B are side views of the magazine-side gear 10. As shown in FIGS. 5A and 5B, a curved cross-section of a gear tooth surface 16 of the magazine-side gear 10 is in the shape of a circular arc about a pivot pin 6. Even when the tool magazine 1 is rotated, therefore, some part of the arcuate gear tooth surface 16 of the magazine-side gear 10 meshes with the motor-side gear 11, so that the connection between the gears can be maintained. Thus, the tool magazine 1 can also be operated at a time other than during tool change.

Although the shape of the magazine-side gear 10 is changed in the present embodiment, the shape of the motor-side gear 11 may alternatively be changed so that the connection between the gears 10 and 11 can be maintained. Further, the gears 10 and 11 used may be shaped so that they can mesh with each other to maintain their connection even when the tool magazine 1 is in a position other than a proximity position.

The present embodiment has been described as being based on the configuration in which the magazine drive motor 9 and the tool magazine 1 rotate integrally with each other and the configuration in which the engagement between the magazine-side gear 10 and the motor-side gear 11 is maintained. Alternatively, however, the tool magazine 1 and the magazine drive motor 9 may be connected by a universal joint, rollers may be used in place of the gears, or a belt or chain for power transmission may be provided between the tool magazine 1 and the magazine drive motor 9.

The invention claimed is:

1. A tool changer for a machine tool, comprising:
a spindle head supporting a spindle for rotation;
a tool magazine provided with a plurality of grips configured to hold a tool on a periphery of the tool magazine;
a magazine drive motor configured to turn the tool magazine about an indexing axis to index the tool; and
a pivot pin about which the tool magazine pivots toward and away from the spindle head to set the tool magazine in a separated position and in a proximity position, respectively; wherein
the tool magazine comprises a tool-magazine power transmission unit,
the magazine drive motor comprises a magazine-drive-motor power transmission unit,
the tool-magazine power transmission unit and the magazine-drive-motor power transmission unit are configured to engage with each other at all times between the proximity position and the separated position relative to the spindle head;
the magazine drive motor is configured to be secured to an immovable portion of the machine tool,
the magazine-drive-motor power transmission unit comprises a magazine-drive-motor-side gear secured to a shaft of the magazine drive motor,
the tool-magazine power transmission unit comprises a tool-magazine-side gear secured to the tool magazine, said tool-magazine-side gear comprising a gear tooth surface meshing with the magazine-drive-motor-side gear, and
a cross-section of the gear tooth surface of the tool-magazine-side gear taken along a plane containing the indexing axis of the tool magazine comprises a circular arc that constitutes a segment of an imaginary circle, wherein the pivot pin is located inside the imaginary circle.

* * * * *